(12) United States Patent
Kieffer et al.

(10) Patent No.: US 12,368,691 B2
(45) Date of Patent: Jul. 22, 2025

(54) SYSTEM AND METHOD FOR GENERATING ALTERNATIVE INFORMATION FORMATS USING ADVANCED COMPUTATIONAL MODELS FOR DATA ANALYSIS AND AUTOMATED PROCESSING

(71) Applicant: BANK OF AMERICA CORPORATION, Charlotte, NC (US)

(72) Inventors: Malinda Kieffer, Chillicothe, MO (US); Tanya A. Wilson, Newark, DE (US); Susan J. Moss, Vestal, NY (US); Andrzej Grabski, Glen Rock, NJ (US); Kiran Boosetty, Jacksonville, FL (US); Donna Lee Phillips, Elkton, MD (US); Gerard P. Gay, Seattle, WA (US); Robert Ronald Rosseland, Jr., Huntersville, NC (US); Ravinder Kaur Sodhi, Royse City, TX (US); Rahul Kumar Mishra, Skillman, NJ (US); Samuel M. Moiyallah, Jr., Newark, DE (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 18/383,275

(22) Filed: Oct. 24, 2023

(65) Prior Publication Data
US 2025/0133045 A1   Apr. 24, 2025

(51) Int. Cl.
*H04L 51/066* (2022.01)
*H04L 51/10* (2022.01)

(52) U.S. Cl.
CPC ............ *H04L 51/066* (2013.01); *H04L 51/10* (2013.01)

(58) Field of Classification Search
CPC .............................. H04L 51/066; H04L 51/10
See application file for complete search history.

(56) References Cited

U.S. PATENT DOCUMENTS

| 8,224,652 B2 | 7/2012 | Wang |
| 11,423,909 B2 | 8/2022 | Sommers |

(Continued)

FOREIGN PATENT DOCUMENTS

| CN | 110166844 B | 8/2019 |
| CN | 110688911 B | 1/2020 |

(Continued)

*Primary Examiner* — William G Trost, IV
*Assistant Examiner* — Adam A Cooney
(74) *Attorney, Agent, or Firm* — Moore & Van Allen PLLC; William Walters

(57) ABSTRACT

Systems, computer program products, and methods are described herein for generating alternative information formats using advanced computational models for data analysis and automated processing. The present disclosure is configured to receive a message, wherein the message comprises one or more content components; transmit the message to an alternative information module, wherein the alternative information module comprises an alternative information database and an artificial intelligence module; determine, using the artificial intelligence module, an alternative information format, wherein the alternative information format is based on the message, and wherein the alternative information format comprises a natural language that uses the visual-manual modality to convey meaning; transmit the message to a sequencing module, wherein the sequencing module integrates the alternative information format into appropriate segments of the message; and create an overlayed communication, wherein the overlayed communication comprises the message and the alternative information format.

17 Claims, 7 Drawing Sheets

(56) References Cited

U.S. PATENT DOCUMENTS

| | | |
|---|---|---|
| 11,482,134 B2 | 10/2022 | Jung |
| 11,783,524 B2 | 10/2023 | Vats |
| 11,836,473 B2 | 12/2023 | Franchitti |
| 11,847,426 B2 | 12/2023 | Retek |
| 2014/0046661 A1* | 2/2014 | Bruner ............... H04N 21/6582 |
| | | 704/235 |
| 2015/0073772 A1 | 3/2015 | Jun |
| 2018/0160192 A1* | 6/2018 | Wu .................... H04N 21/4302 |
| 2019/0171716 A1* | 6/2019 | Weber ...................... H04N 7/15 |
| 2020/0159833 A1* | 5/2020 | Natesan .................. G10L 21/06 |
| 2021/0043110 A1* | 2/2021 | Jung ........................ G10L 15/24 |
| 2021/0160580 A1* | 5/2021 | Janugani ................ G10L 21/18 |
| 2022/0075793 A1 | 3/2022 | Jezewski |
| 2022/0150285 A1 | 5/2022 | Okina |
| 2022/0327309 A1* | 10/2022 | Carlock .................. G06F 40/47 |
| 2023/0082830 A1 | 3/2023 | Fan |
| 2023/0316952 A1* | 10/2023 | Peralta .................... G10L 13/00 |
| | | 704/271 |
| 2023/0343011 A1* | 10/2023 | Kelly ................... G06T 13/205 |

FOREIGN PATENT DOCUMENTS

| | | |
|---|---|---|
| CN | 114359446 A | 4/2022 |
| JP | 2021179689 A | 11/2021 |
| KR | 100730573 B1 | 6/2007 |
| KR | 101777807 B1 | 9/2017 |
| KR | 102174922 B1 | 11/2020 |
| WO | 2017195775 A1 | 11/2017 |
| WO | 2022106654 A2 | 5/2022 |

\* cited by examiner

US 12,368,691 B2

SYSTEM AND METHOD FOR GENERATING ALTERNATIVE INFORMATION FORMATS USING ADVANCED COMPUTATIONAL MODELS FOR DATA ANALYSIS AND AUTOMATED PROCESSING

TECHNOLOGICAL FIELD

Example embodiments of the present disclosure relate to generating alternative information formats using advanced computational models for data analysis and automated processing.

BACKGROUND

There are significant challenges associated with generating messages directed towards those with hearing disabilities. Applicant has identified a number of deficiencies and problems associated with generating alternative information formats using advanced computational models for data analysis and automated processing. Through applied effort, ingenuity, and innovation, many of these identified problems have been solved by developing solutions that are included in embodiments of the present disclosure, many examples of which are described in detail herein.

BRIEF SUMMARY

The following presents a simplified summary of one or more embodiments of the present disclosure, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

Systems, methods, and computer program products are provided for generating alternative information formats using advanced computational models for data analysis and automated processing.

Embodiments of the present invention address the above needs and/or achieve other advantages by providing apparatuses (e.g., a system, computer program product, and/or other devices) and methods for generating alternative information formats using advanced computational models for data analysis and automated processing. The system embodiments may comprise a processing device and a non-transitory storage device containing instructions when executed by the processing device, to perform the steps disclosed herein. In computer program product embodiments of the invention, the computer program product comprises a non-transitory computer-readable medium comprising code causing an apparatus to perform the steps disclosed herein. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the steps disclosed herein.

In some embodiments, the present invention may receive a message, wherein the message comprises one or more content components. In some embodiments, the present invention may transmit the message to an alternative information module, wherein the alternative information module comprises an alternative information database and an artificial intelligence module. In some embodiments, the present invention may determine, using the artificial intelligence module, an alternative information format, wherein the alternative information format is based on the message, and wherein the alternative information format comprises a natural language that uses the visual-manual modality to convey meaning. In some embodiments, the present invention may transmit the message to a sequencing module, wherein the sequencing module integrates the alternative information format into appropriate segments of the message. In some embodiments, the present invention may create an overlayed communication, wherein the overlayed communication comprises the message and the alternative information format.

In some embodiments, the message may include a video component. In some embodiments, the message may include an audio component. In some embodiments, the message may include a textual component.

In some embodiments, the alternative information format may include sign language.

In some embodiments, the alternative information database may include a sign language database.

In some embodiments, the sequencing module may include importing the message into a message processing environment, wherein the message processing environment comprises the artificial intelligence module. In some embodiments, the sequencing module may include determining, using the artificial intelligence module, the alternative information format that correspond to the message. In some embodiments, the sequencing module may include creating overlayed communication elements, wherein the overlayed communication elements comprise the alternative information format that correspond to the message. In some embodiments, the sequencing module may include positioning the overlayed communication elements into the appropriate segments of the message. In some embodiments, the sequencing module may include exporting the overlayed communication, wherein exporting the overlayed communication comprises transferring the message to a user device.

In some embodiments, the present invention may receive metadata, wherein the metadata comprises message characteristics associated with the message. In some embodiments, the present invention may determine, using the artificial intelligence module and in response to the metadata, the alternative information format. In some embodiments, the present invention may create the overlayed communication, wherein the overlayed communication comprises the message and the alternative information format.

In some embodiments, the present invention may receive, from the user device, a user message, wherein the user message comprises an alternative information format. In some embodiments, the present invention may determine, using the artificial intelligence module and the alternative information database and in response to the user message, a standard information format. In some embodiments, the present invention may create a text overlay, wherein the text overlay comprises the user message and a text message that corresponds with the user message. In some embodiments, the present invention may transmit the text overlay to a third party device.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
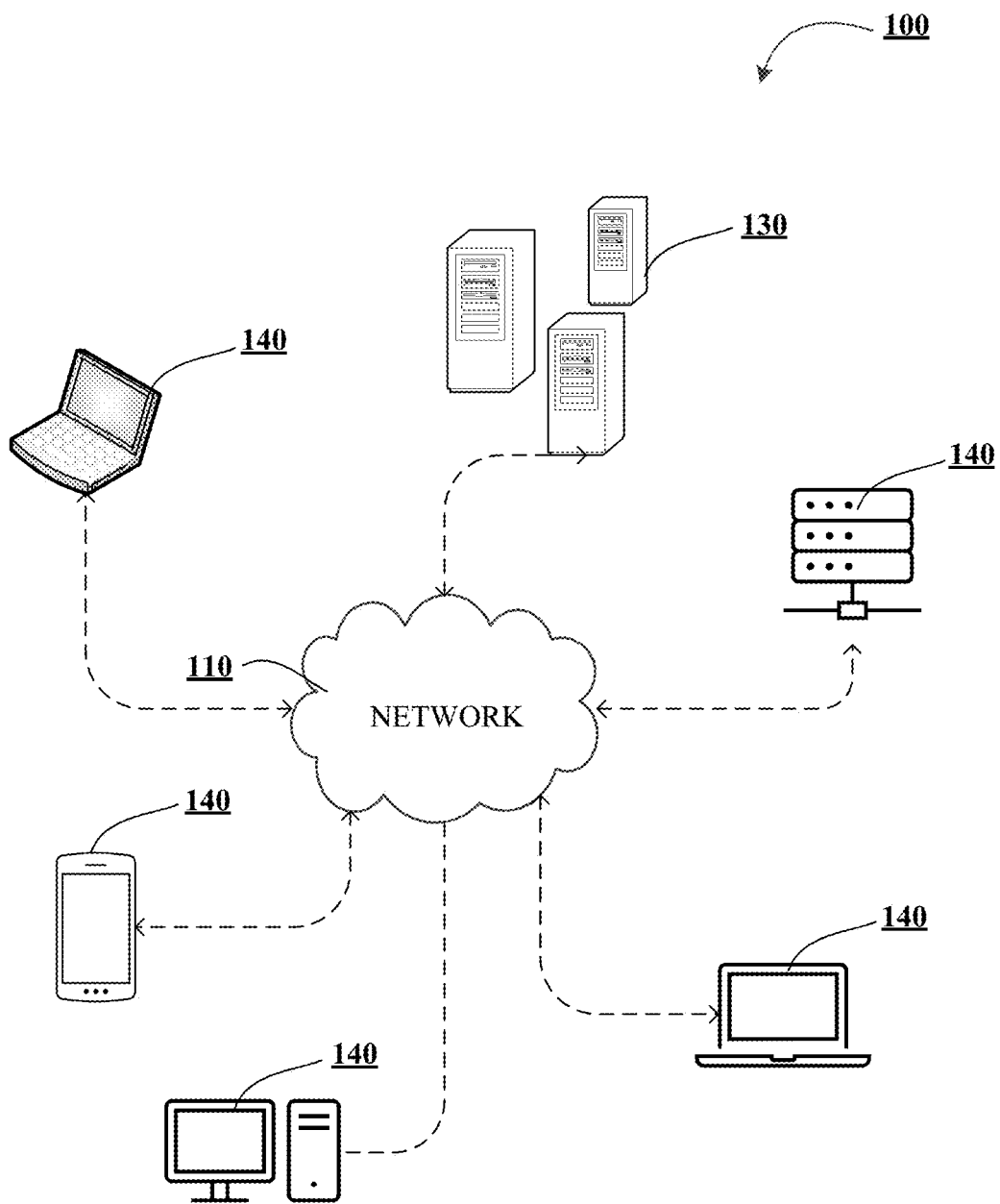
Figure 1B:
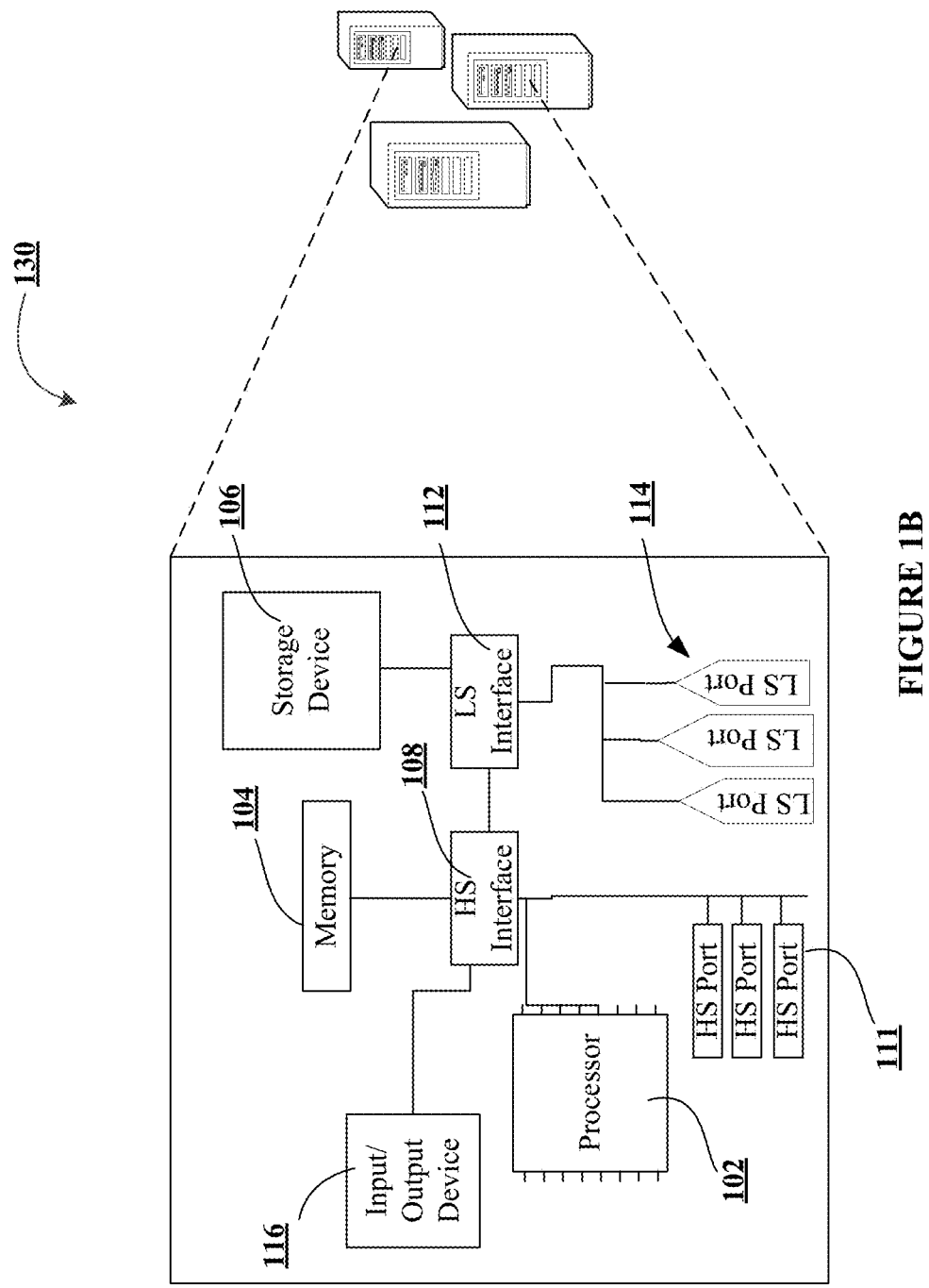
Figure 1C:
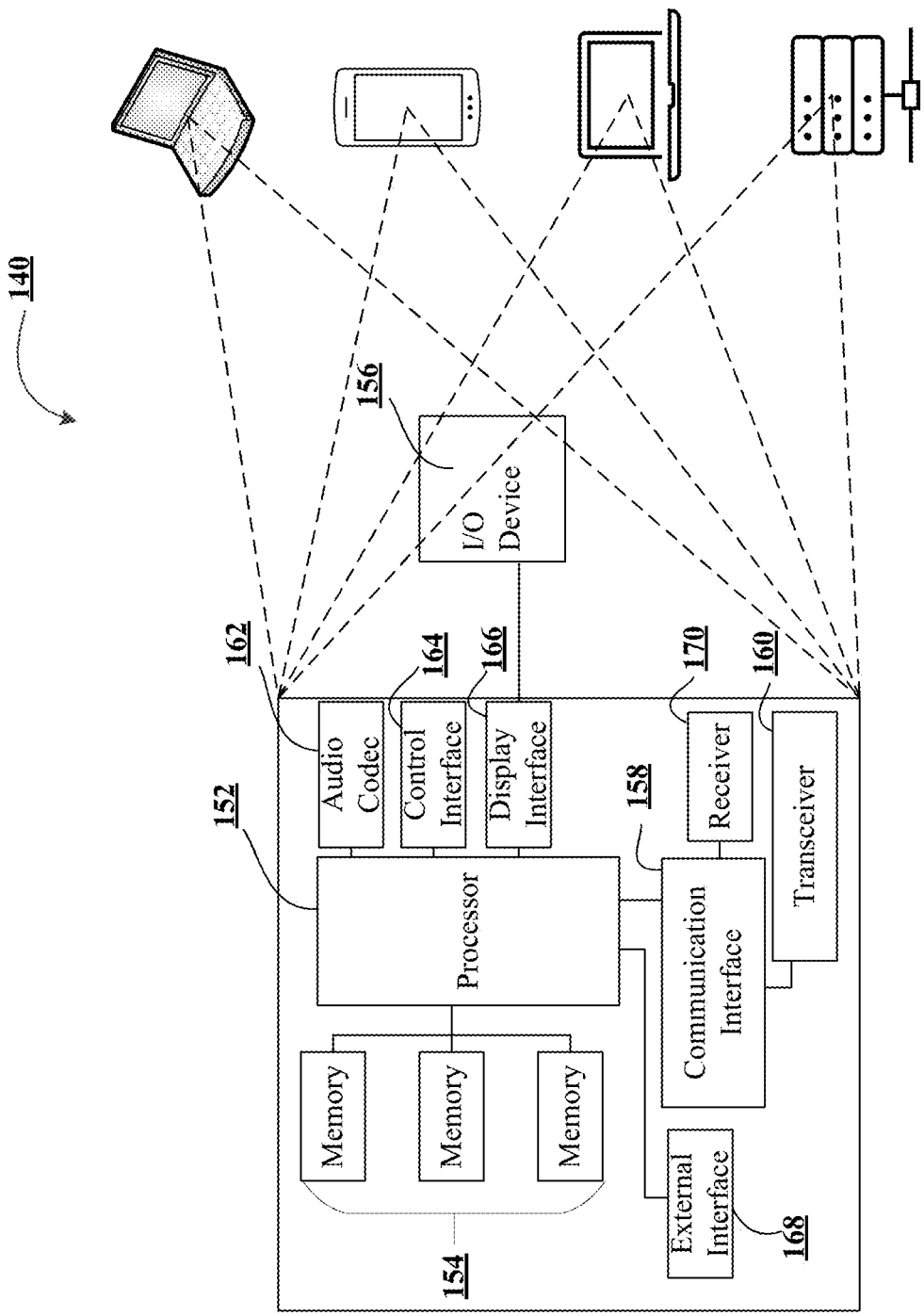

FIGS. 1A-1C illustrates technical components of an exemplary distributed computing environment for generating alternative information formats using advanced computational models for data analysis and automated processing, in accordance with an embodiment of the disclosure.

Figure 2:
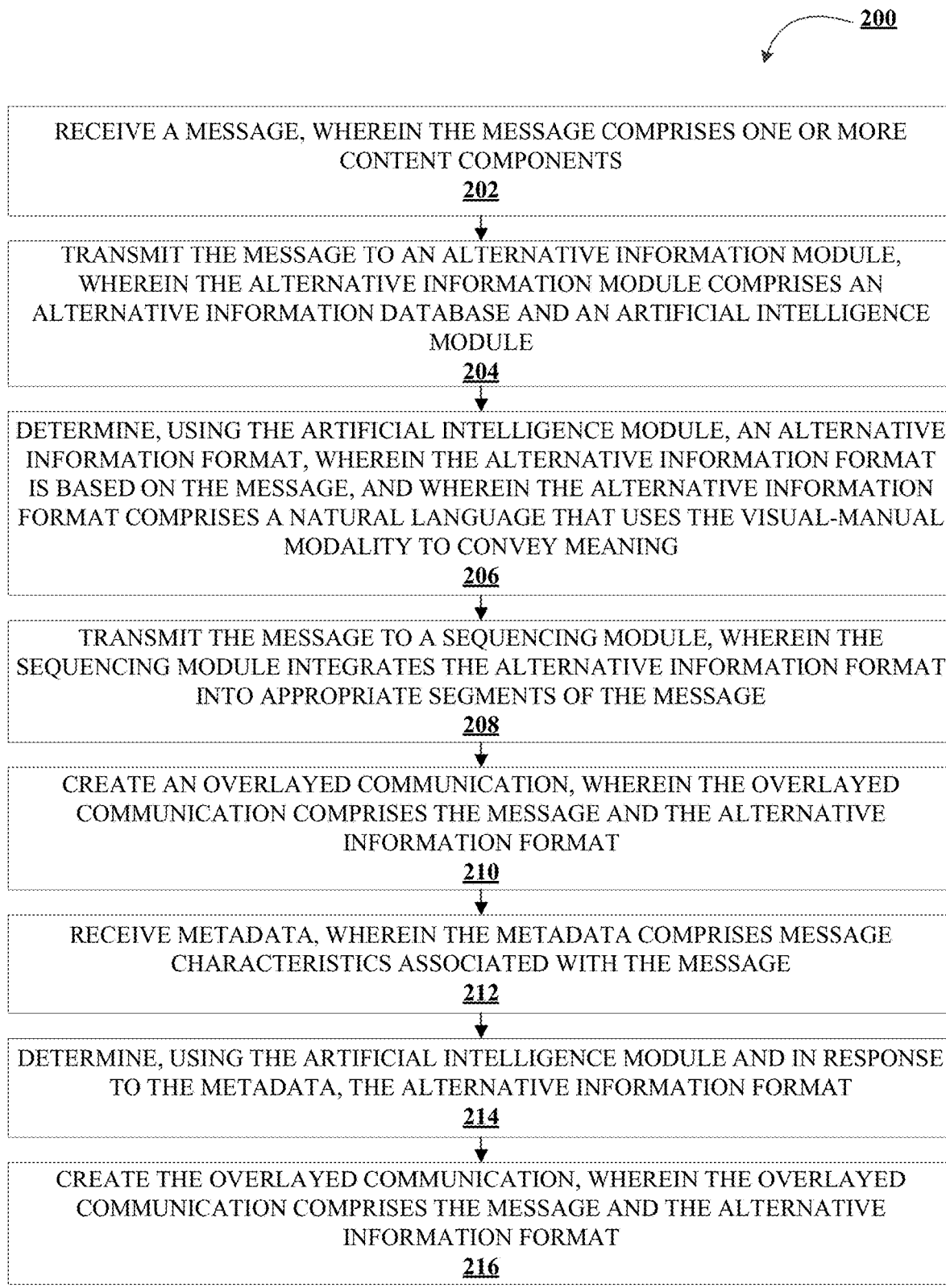

FIG. 2 illustrates a process flow for generating alternative information formats using advanced computational models for data analysis and automated processing, in accordance with an embodiment of the disclosure.

Figure 3:
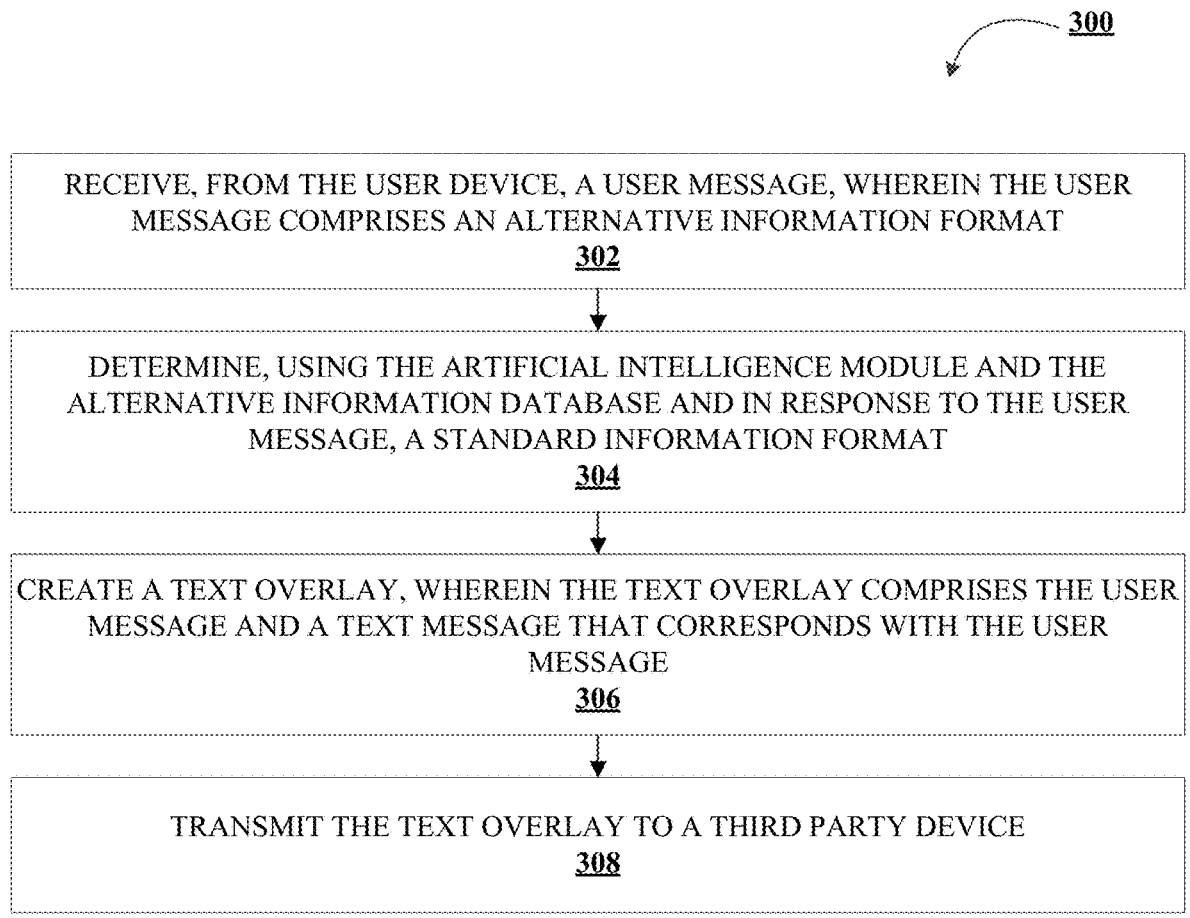

FIG. 3 illustrates a process flow for transmitting a text overlay to a third party device, in accordance with an embodiments of the disclosure.

Figure 4:
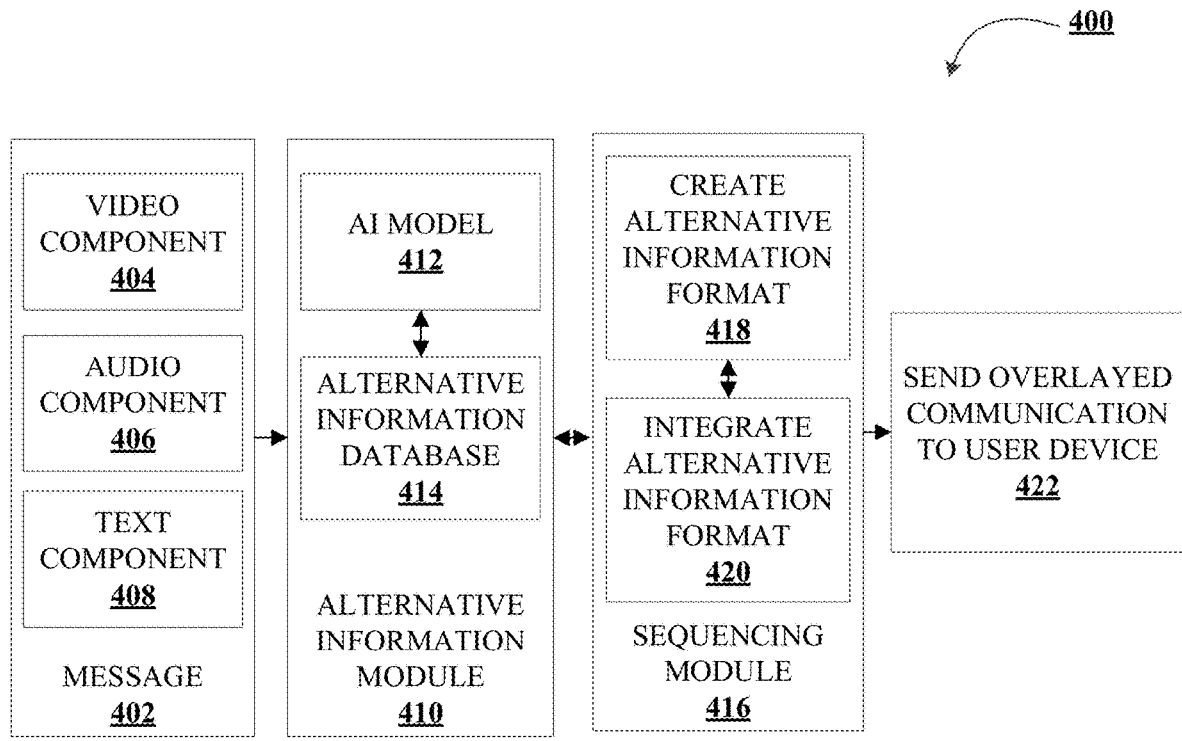

FIG. 4 illustrates a non-limiting example process flow of an alternative information format system, in accordance with an embodiment of the disclosure.

Figure 5:
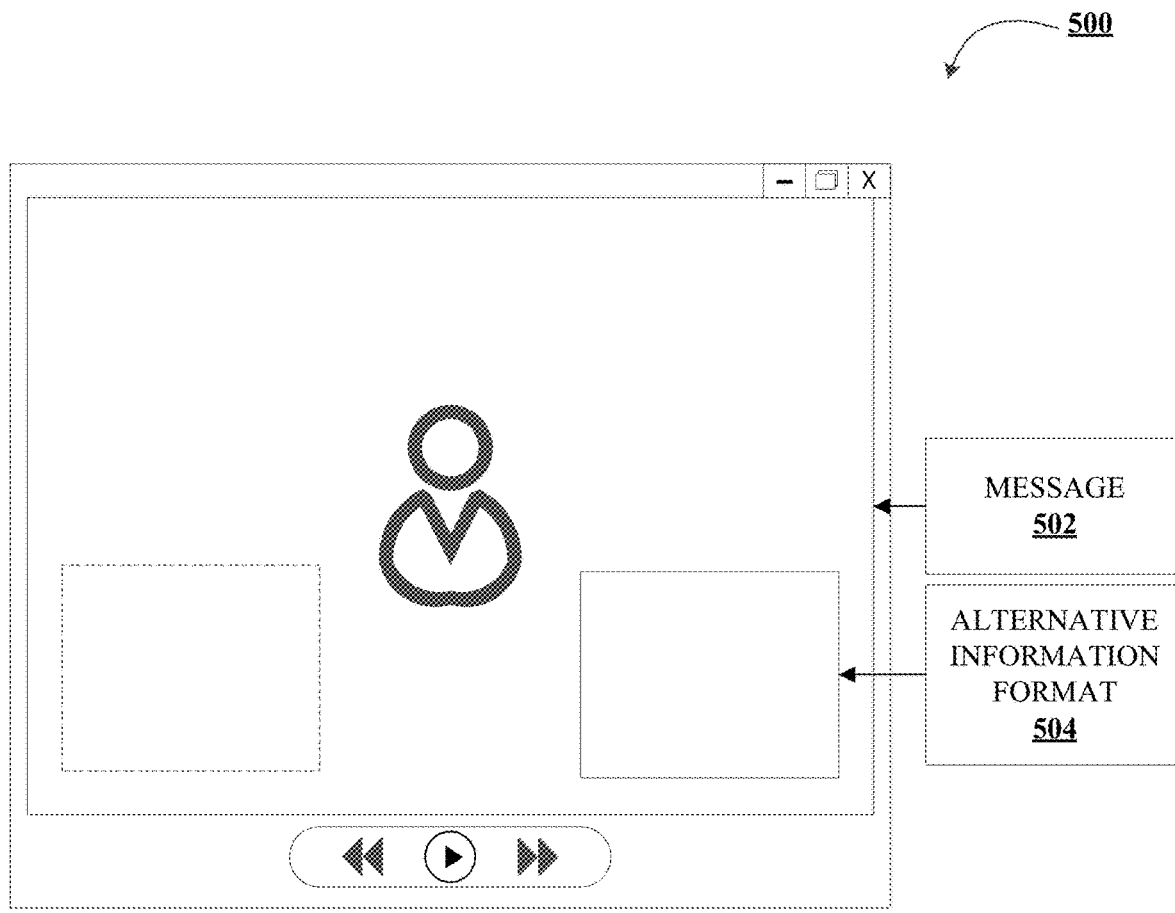

FIG. 5 illustrates an additional non-limiting example process flow of the alternative information format system, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "transfer," a "distribution," and/or an "allocation" may refer to any transaction, activities or communication between one or more entities, or between the user and the one or more entities. A resource transfer may refer to any distribution of resources such as, but not limited to, a payment, processing of funds, purchase of goods or services, a return of goods or services, a payment transaction, a credit transaction, or other interactions involving a user's resource or account. Unless specifically limited by the context, a "resource transfer" a "transaction", "transaction event" or "point of transaction event" may refer to any activity between a user, a merchant, an entity, or any combination thereof. In some embodiments, a resource transfer or transaction may refer to financial transactions involving direct or indirect movement of funds through traditional paper transaction processing systems (i.e. paper check processing) or through electronic transaction processing systems. Typical financial transactions include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points etc. When discussing that resource transfers or transactions are evaluated, it could mean that the transaction has already occurred, is in the process of occurring or being processed, or that the transaction has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures and/or credentials, and the like.

Those with hearing disabilities may take part in interactions in a limited way. For instance, compliance, regulatory, role, and function training may only be completed through reading associated materials or reading closed captioning during training videos. Those without a disability can watch a video while those with vision issues can have the materials read to them. In this way, conventional systems have not accounted for those with hearing disabilities. Therefore, a need exists for an alternative information format system that allows users to view messages in alternative information formats.

In some embodiments, an alternative information format system may receive a message, wherein the message may include a video conference call, or the like. In some embodiments, the alternative information format system may transfer the message to an alternative information module, wherein the alternative information module includes an artificial intelligence module and an alternative information database (e.g., sign language database, or the like). In some embodiments, the alternative information module may use the artificial intelligence module to search the sign language database to determine which sign (e.g., alternative information format) corresponds with a portion of the message. In some embodiments, the message may be transferred to a sequencing module, wherein the sequencing module includes creating the alternative information format and integrating the alternative information format. In this way, the alternative information format system may create an overlayed communication, wherein the overlayed communication includes the message and the signs (e.g., alternative information formats) that correspond with the message.

What is more, the present disclosure provides a technical solution to a technical problem. As described herein, the technical problem includes messages being displayed in conventional ways that do not account for those with a hearing disability. The technical solution presented herein allows for an alternative information system to transform a message into an alternative information format. In particular, the alternative information format system is an improvement over existing solutions to the issues surrounding conventional systems that transfer messages, (i) with fewer steps to achieve the solution, thus reducing the amount of computing resources, such as processing resources, storage resources, network resources, and/or the like, that are being used, (ii) providing a more accurate solution to problem, thus reducing the number of resources required to remedy any errors made due to a less accurate solution, (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment 100 for generating alternative information formats using advanced computational models for data analysis and automated processing, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server (e.g., system 130). In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, resource distribution devices, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. In some embodiments, the network 110 may include a telecommunication network, local area network (LAN), a wide area network (WAN), and/or a global area network (GAN), such as the Internet. Additionally, or alternatively, the network 110 may be secure and/or unsecure and may also include wireless and/or wired and/or optical interconnection technology. The network 110 may include one or more wired and/or wireless networks. For example, the network 110 may include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion, or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, storage device 106, a high-speed interface 108 connecting to memory 104, high-speed expansion points 111, and a low-speed interface 112 connecting to a low-speed bus 114, and an input/output (I/O) device 116. The system 130 may also include a high-speed interface 108 connecting to the memory 104, and a low-speed interface 112 connecting to low-speed port 114 and storage device 106. Each of the components 102, 104, 106, 108, 111, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system. The processor 102 may process instructions for execution within the system 130, including instructions stored in the memory 104 and/or on the storage device 106 to display graphical information for a GUI on an external input/output device, such as a display 116 coupled to a high-speed interface 108. In some embodiments, multiple processors, multiple buses, multiple memories, multiple types of memory, and/or the like may be used. Also, multiple systems, same or similar to system 130, may be connected, with each system providing portions of the necessary operations (e.g., as a server bank, a group of blade servers, a multi-processor system, and/or the like). In some embodiments, the system 130 may be managed by an entity, such as a business, a merchant, a financial institution, a card management institution, a software and/or hardware development company, a software and/or hardware testing company, and/or the like. The system 130 may be located at a facility associated with the entity and/or remotely from the facility associated with the entity.

The processor 102 can process instructions, such as instructions of an application that may perform the functions disclosed herein. These instructions may be stored in the memory 104 (e.g., non-transitory storage device) or on the storage device 106, for execution within the system 130 using any subsystems described herein. It is to be understood that the system 130 may use, as appropriate, multiple processors, along with multiple memories, and/or I/O devices, to execute the processes described herein.

The memory 104 may store information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 106, or memory on processor 102.

In some embodiments, the system 130 may be configured to access, via the network 110, a number of other computing devices (not shown). In this regard, the system 130 may be configured to access one or more storage devices and/or one or more memory devices associated with each of the other computing devices. In this way, the system 130 may implement dynamic allocation and de-allocation of local memory resources among multiple computing devices in a parallel and/or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, the memory may appear to be allocated from a central pool of memory, even though the memory space may be distributed throughout the system. Such a method of dynamically allocating memory provides increased flexibility when the data size changes during the lifetime of an application and allows memory reuse for better utilization of the memory resources when the data sizes are large.

The high-speed interface 108 manages bandwidth-intensive operations for the system 130, while the low-speed interface 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed interface 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router (e.g., through a network adapter).

The system 130 may be implemented in a number of different forms. For example, the system 130 may be implemented as a standard server, or multiple times in a group of such servers. Additionally, the system 130 may also be implemented as part of a rack server system or a personal computer (e.g., laptop computer, desktop computer, tablet computer, mobile telephone, and/or the like). Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 156, 158, 160, 162, 164, 166, 168 and 170, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor 152 may be implemented as a chipset of chips that include separate and multiple analog and digital processors. The processor 152 may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156 (e.g., input/output device 156). The display 156 may be, for example, a Thin-Film-Transistor Liquid Crystal Display (TFT LCD) or an Organic Light Emitting Diode (OLED) display, or other appropriate display technology. An interface of the display may include appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a Single In Line Memory Module (SIMM) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner. In some embodiments, the user may use applications to execute processes described with respect to the process flows described herein. For example, one or more applications may execute the process flows described herein. In some embodiments, one or more applications stored in the system 130 and/or the user input system 140 may interact with one another and may be configured to implement any one or more portions of the various user interfaces and/or process flow described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, GPRS, and/or the like. Such communication may occur, for example, through transceiver 160. Additionally, or alternatively, short-range communication may occur, such as using a Bluetooth, Wi-Fi, near-field communication (NFC), and/or other such transceiver (not shown). Additionally, or alternatively, a Global Positioning System (GPS) receiver module 170 may provide additional navigation-related and/or location-related wireless data to user input system 140, which may be used as appropriate by applications running thereon, and in some embodiments, one or more applications operating on the system 130.

Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed application specific integrated circuits (ASICs), computer hardware, firmware, software, and/or combinations thereof.

FIG. 2 illustrates a process flow for generating alternative information formats using advanced computational models for data analysis and automated processing, in accordance with an embodiment of the disclosure. The method may be carried out by various components of the distributed computing environment 100 discussed herein (e.g., the system 130, one or more end-point device(s) 140, etc.). An example system may include at least one processing device and at least one non-transitory storage device with computer-readable program code stored thereon and accessible by the at least one processing device, wherein the computer-readable code when executed is configured to carry out the method discussed herein.

In some embodiments, an alternative information format system (e.g., similar to one or more of the systems described herein with respect to FIGS. 1A-1C) may perform one or more of the steps of process flow 200. For example, an alternative information format system (e.g., the system 130 described herein with respect to FIGS. 1A-1C) may perform the steps of process flow 200.

As shown in block 202, the process flow 200 of this embodiment includes receiving a message, wherein the message comprises one or more content components. In some embodiments, the message may include a video component, an audio component, a textual component, and/or the like. In some embodiments, the message may comprise one or more of these components (e.g., video, audio, textual component, and/or the like). In some embodiments, a message may include a video component, audio component, and a textual component. In this way, the message may be a multimedia message.

In some embodiments, the message may include a real time video, such as a virtual conference, a real time stream, a real time transmission of the message, a phone call, and/or the like. In this way, the message may be a message continuously received by the alternative information format system.

In some embodiments, the message may be a pre-recorded (e.g., pre-saved) message that may be transmitted to the alternative information format system. In some embodiments, the message may include a pre-recorded video, a pre-recorded audio message, and/or the like.

As shown in block 204, the process flow 200 of this embodiment includes transmitting the message to an alternative information module, wherein the alternative information module comprises an alternative information database and an artificial intelligence module. In some embodiments, the message may be transferred to the alternative information module. In some embodiments, the alternative information module may include an artificial intelligence module and an alternative information format database. In some embodiments, the artificial intelligence module may use a variety of tools to analyze the components of the message. For instance, and by way of non-limiting example, if a message includes an audio and video component, the artificial intelligence module may analyze the audio and video components of the message.

In some embodiments, the artificial intelligence module may reference the alternative information format database. In some embodiments, the artificial intelligence module may search the alternative information format database for alternative information formats that correspond with the message. For instance, and by way of non-limiting example, the artificial intelligence module may determine that a particular alternative information format corresponds with a particular portion of the message. In some embodiments, the artificial intelligence module will search through the alternative information format database for alternative information formats that correspond with the entire message.

As shown in block 206, the process flow 200 of this embodiment includes determining, using the artificial intelligence module, an alternative information format, wherein the alternative information format is based on the message, and wherein the alternative information format comprises a natural language that uses the visual-manual modality to convey meaning. In some embodiments, the artificial intelligence module may, in real time, analyze the message and compare the message with the alternative information database. In some embodiments, the artificial intelligence module may use natural language processing, natural language generation, machine learning, and/or the like. In this way, the artificial intelligence module may use automatic speech recognition, transcription methods, speech-to-text methods, and/or the like. Further, the artificial intelligence module may categorize the message, use keyword spotting within the message, analyze the sentiment in the message, analyze any silence or pauses within the message, and/or the like.

In some embodiments, the alternative information database may include one or more natural languages that are alternative modes of communication. In some embodiments, the artificial intelligence module may use the alternative information database to determine which alternative information format applies to the message.

In some embodiments, a user may select which alternative information format the user wishes to receive from the alternative information format system. In some embodiments, a third party (e.g., the creator of the message, or the like) may select which, if any, alternative information format applies to the message. In this way, the user and/or the third party may have control over what types of alternative information formats are presented.

As shown in block 208, the process flow 200 of this embodiment includes transmitting the message to a sequencing module, wherein the sequencing module integrates the alternative information format into appropriate segments of the message. In some embodiments, the sequencing module may analyze the message to determine how the alternative information formats should be positioned, placed, sized, adjusted, and/or the like to create an overlayed communication. Further, in some embodiments, the sequencing module may synchronize the alternative information format with the message so the alternative information format is displayed at the correct time.

In some embodiments, the artificial intelligence module may identify where in the message the alternative information formats should be positioned. In some embodiments, the sequencing module may, in response to the identified portions of the message, position the alternative information formats in a corresponding manner.

In some embodiments, the message and the corresponding alternative information formats may be transferred to the sequencing module. In some embodiments, the sequencing module may create an overlayed communication, wherein the overlayed communication includes the alternative information formats determined to correspond with the message and the message.

In some embodiments, creating the overlayed communication elements may include creating models, figures, images, and/or the like in a two-dimensional or three-dimensional way to be overlayed on the message. In some embodiments, the overlayed communication elements may be created to be suitable for viewing in virtual reality, augmented reality, extended reality, parallel reality, and/or the like.

In some embodiments, the sequencing module may integrate the overlayed communication elements into the message. In this way, the alternative information formats may be placed on the message in the appropriate portions of the message. For instance, and by way of non-limiting example, if a particular alternative information format corresponds to a particular portion of the message, the sequencing module may integrate the alternative information format at that particular portion of the message. In this way, the alternative information formats may correspond in substance (e.g., meaning of the message, meaning of the alternative information format) and in placement (e.g., at which duration the alternative information format is displayed with respect to the message) as compared with the message.

As shown in block 210, the process flow 200 of this embodiment includes creating an overlayed communication, wherein the overlayed communication comprises the message and the alternative information format. In some embodiments, the overlayed communication may be created by the artificial intelligence module. In some embodiments, the overlayed communication may be displayed on a device (e.g., user device, end-point device(s) 140, third party device, and/or the like). In some embodiments, if the message is a video message (e.g., includes a video component), the overlayed communication may show the message along with the alternative information formats that correspond with the portion of the message that is displayed. In some embodiments, the alternative information format system may adjust the positioning of the alternative information formats to optimize viewing the original message.

In some embodiments, when the message is an audio message (e.g., does not include a video component), the overlayed communication may create a display that includes the original audio message and the alternative information formats that correspond with the message.

As shown in block 212, the process flow 200 of this embodiment includes receiving metadata, wherein the metadata comprises message characteristics associated with the message. In some embodiments, the characteristics associated with the message may include emphasis, pronunciation, inflections, pauses, body language, facial movements, and/or the like. In some embodiments, the alternative information format system may determine the characteristics adjust or alter the meaning of the message in such a way that should be captured by the alternative information format. For instance, and by way of non-limiting example, if a message contains a phrase that may be altered depending on a particular emphasis, the alternative information format system may include the altered meaning within the overlayed communication. In this way, the overlayed communication may include the meaning of the message with the emphasis added as opposed to the message without the emphasis.

As shown in block 214, the process flow 200 of this embodiment includes determining, using the artificial intelligence module and in response to the metadata, the alternative information format. In some embodiments, the alternative information format system may determine an alternative information format in response to the message characteristics, or metadata, associated with the message. For instance, and by way of non-limiting example, the alternative information format system may determine that a particular alternative information format is more appropriate considering the body language of a speaker shown on the message. In this way, the alternative information format may better capture the substantive information the speaker is conveying in the message as opposed to determining an alternative information format without considering the metadata.

As shown in block 216, the process flow 200 of this embodiment includes creating the overlayed communication, wherein the overlayed communication comprises the message and the alternative information format. In some embodiments, the alternative information format comprises sign language. In some embodiments, the sign language may include deaf sign languages, auxiliary sign languages, signed modes of spoken languages, and/or the like.

In some embodiments, the alternative information database comprises a sign language database. In some embodiments, the sign language database may include databases of sign language, such as American Sign Language, British Sign Language, French Sign Language, Auslan, Spanish Sign Language, Pidgin Signed English, Signing Exact English, and/or the like.

In some embodiments, the sequencing module includes importing the message into a message processing environment, wherein the message processing environment comprises the artificial intelligence module. In some embodiments, the sequencing module includes determining, using the artificial intelligence module, the alternative information format that correspond to the message. In some embodiments, the sequencing module includes creating overlayed communication elements, wherein the overlayed communication elements comprise the alternative information format that correspond to the message. In some embodiments, the sequencing module includes positioning the overlayed communication elements into the appropriate segments of the message. In some embodiments, the sequencing module includes exporting the overlayed communication, wherein exporting the overlayed communication comprises transferring the message to a user device.

FIG. 3 illustrates a process flow for transmitting a text overlay to a third party device, in accordance with an embodiment of the disclosure. The method may be carried out by various components of the distributed computing environment 100 discussed herein (e.g., the system 130, one or more end-point device(s) 140, etc.). An example system may include at least one processing device and at least one non-transitory storage device with computer-readable program code stored thereon and accessible by the at least one processing device, wherein the computer-readable code when executed is configured to carry out the method discussed herein.

In some embodiments, an alternative information format system (e.g., similar to one or more of the systems described herein with respect to FIGS. 1A-1C) may perform one or more of the steps of process flow 300. For example, an alternative information format system (e.g., the system 130 described herein with respect to FIGS. 1A-1C) may perform the steps of process flow 300.

As shown in block 302, the process flow 300 of this embodiment includes receiving, from the user device, a user message, wherein the user message comprises an alternative information format. In some embodiments, the user may transmit a user message to the alternative information format system. In some embodiments, the user message may include an alternative information format system. In some embodiments, the user message may include the user communicating with sign language.

In some embodiments, the user may create the user message on a user device (e.g., similar to end-point device(s) 140). In some embodiments, the user device may include a camera that may capture the user's communication to create a video.

In some embodiments, the user message may include user message characteristics. In some embodiments, the user message characteristics may be similar to message characteristics, listed above (e.g., emphasis, pronunciation, inflections, pauses, body language, facial movements, and/or the like). In some embodiments, the user message characteristics may adjust or alter the user message's meaning.

As shown in block 304, the process flow 300 of this embodiment includes determining, using the artificial intelligence module and the alternative information database and in response to the user message, a standard information format. In some embodiments, the standard information format may include a textual representation of the user's message, an audio representation of the user's message, a video representation of the user's message, and/or the like. In some embodiments, the standard information format may include an audio, video, and textual representation of the user message. In this way, the standard information format may include a video with audio and text overlay that represents the user message.

In some embodiments, the artificial intelligence module may search, in response to the user message, the alternative information database to determine the meaning of the user message. In this way, the artificial intelligence module may compare the user message with the alternative information formats in the alternative information database. For instance, the user message may include a message that corresponds with a greeting. In some embodiments, the artificial intelligence module may determine the meaning of the user's greeting by searching the alternative information database. Further, the artificial intelligence module may then create a standard information format that represents the user message in response to the alternative information formats found in the alternative information database.

As shown in block 306, the process flow 300 of this embodiment includes creating a text overlay, wherein the text overlay comprises the user message and a text message that corresponds with the user message. In some embodiments, the alternative information format system may create an audio overlay, a video overlay, and/or the like, wherein the overlays include the user message. In this way, the alternative information format system may create different types of overlays that correspond with the user message. For instance, if the artificial intelligence module creates a standard information format that represents a greeting (e.g., a greeting from the user in the user message), the alternative information format system may create a text overlay, video overlay, or audio overlay that corresponds with the user message.

As shown in block 308, the process flow 300 of this embodiment includes transmitting the text overlay to a third party device. In some embodiments, the third party device may include an end-point device (e.g., similar to end-point device(s) 140).

FIG. 4 illustrates a non-limiting example process flow of an alternative information format system, in accordance with an embodiment of the disclosure. The method may be carried out by various components of the distributed computing environment 100 discussed herein (e.g., the system 130, one or more end-point device(s) 140, etc.). An example system may include at least one processing device and at least one non-transitory storage device with computer-readable program code stored thereon and accessible by the at least one processing device, wherein the computer-readable code when executed is configured to carry out the method discussed herein.

In some embodiments, an alternative information format system (e.g., similar to one or more of the systems described herein with respect to FIGS. 1A-1C) may perform one or more of the steps of process flow 400. For example, an alternative information format system (e.g., the system 130 described herein with respect to FIGS. 1A-1C) may perform the steps of process flow 400.

As shown in block 402, the process flow 400 of this embodiment includes a message. In some embodiments, the message may include a real-time message wherein the alternative information format system may be actively receiving the message. In some embodiments, the message may include a virtual video conference, phone call, live stream, or the like. In some embodiments, the message may include a pre-recorded message, such as a pre-recorded video, audio message, or the like. In some embodiments, the message may include a training video an entity has created for the entity's employees.

As shown in block 404, the process flow 400 of this embodiment includes a video component. In some embodiments, the video component may include a video in real time. In some embodiments, the video component may be in a variety of forms, such as formatted for a mobile device, personal computing device, virtual reality device, augmented reality device, extended reality device, parallel reality device, and/or the like.

As shown in block 406, the process flow 400 of this embodiment includes an audio component. In some embodiments, the audio component may include audio that may or may not correspond with the video component. In some embodiments, the audio component may include a narration describing a video component of the message. In some embodiments, the message may comprise only an audio portion, such as a song, a radio show, a podcast, an audiobook, and/or the like.

As shown in block 408, the process flow 400 of this embodiment includes a text component. In some embodiments, the message may have a text component that describes a certain aspect about the message. For instance, if the message includes a video component, a text component may describe a portion of the video.

As shown in block 410, the process flow 400 of this embodiment includes an alternative information module. In some embodiments, the alternative information module may receive the message. In some embodiments, the alternative information module may include an artificial intelligence module, an alternative information database, and/or the like. In some embodiments, the alternative information module may include determining which alternative information formats correspond with the message.

As shown in block 412, the process flow 400 of this embodiment includes an artificial intelligence module. In some embodiments, the artificial intelligence module may include receiving the message and searching the alternative information database for alternative information formats that correspond with the meaning of the message.

For instance, if a message includes a virtual conference training video of a video and audio component, the artificial intelligence module may continuously search the alternative information format database in real time. In this way, the artificial intelligence module may dynamically determine the alternative information formats that apply to the message.

Further, the artificial intelligence module may ingest the message to determine the meaning of the message. In this way, the artificial intelligence module may use natural language processing, machine learning, sentiment analysis, and/or the like to determine the meaning of the message. In some embodiments, the artificial intelligence module may perform a video analysis on the video component. For instance, the artificial intelligence module may perform frame extraction (e.g., extracting individual frames of the video), object detection (e.g., identification and categorization of objects within the frames using pre-trained models, or the like), action recognition (e.g., determining actions and interactions occurring between the detected objects), scene understanding (e.g., analyzing the context, environment, setting, and/or the like of the video component).

Similarly, the artificial intelligence module may perform an audio analysis on an audio component using audio segmentation (e.g., dividing the audio track into segments), feature extraction (e.g., extracting features such as pitch, tone, frequency, pronunciation, emphasis, and/or the like), speech recognition (e.g., converting spoken words into text for analysis), audio classification (e.g., identifying and classifying background sound and noise).

Further, in some embodiments, the artificial intelligence module may use natural language processing which may include transcription, entity recognition, sentiment analysis, semantic analysis, and/or the like. In this way, the artificial intelligence module may convert spoken words into structured data, identify entities, names, places, terminologies, and/or the like within the message, determine sentiment and emotion of the message, extract meaning and context from the message, and/or the like. In some embodiments, the artificial intelligence module may integrate the video and audio components to perform comprehensive analysis. In some embodiments, this may include a temporal alignment (e.g., aligning the audio and video components in time to associate the video and corresponding audio), contextual analysis (e.g., determining context based on the video component and audio components), and/or the like. In some embodiments, the artificial intelligence module may use machine learning to train, predict, validate, and/or the like the message and its associated components. In this way, the artificial intelligence module may continuously learn throughout the process.

As shown in block 414, the process flow 400 of this embodiment includes an alternative information database. In some embodiments, the alternative information database may include many alternative forms of natural language (e.g., alternative information formats). In some embodiments, the alternative information database may include natural languages such as sign language. In some embodiments, the alternative information database may include specific motions associated with the alternative information formats. In some embodiments, the motions may include movements of the body that creates a sign language.

As shown in block 416, the process flow 400 of this embodiment includes a sequencing module. In some embodiments, the sequencing module may include creating the alternative information format and/or integrating the alternative information format. In some embodiments, the sequencing module may interact with the alternative information module, artificial intelligence module, and/or the alternative information database. In this way, the sequencing module may use the artificial intelligence module to create alternative information formats that correspond with the message. For instance, if the artificial intelligence module determines the alternative information formats, the sequencing module may create the alternative information formats using the artificial intelligence module.

As shown in block 418, the process flow 400 of this embodiment includes creating an alternative information format. In some embodiments, creating the alternative information format may include creating figures, models, and/or the like that will be used to overlay over the message. In some embodiments, this may include collecting the message components and processing those components.

Further, in some embodiments, creating the alternative information format may include creating the content that will be overlayed over the message. In some embodiments, this may include generational adversarial networks (GANs), generative models, customizing parameters of the alternative information formats, and/or the like.

As shown in block 420, the process flow 400 of this embodiment includes integrating the alternative information format. In some embodiments, integrating the alternative information format may include positioning an overlayed communication elements into the appropriate segments of the message. In some embodiments, the alternative information format system may superimpose the created content (e.g., alternative information formats) onto the message to create the overlayed communication. In some embodiments, this may include aligning the context of the alternative information format with the context of the message. In some embodiments, integrating the alternative information format may include adjusting parameters associated with the alternative information format, such as modifying the size, opacity, position, and/or the like of the alternative information format.

As shown in block 422, the process flow 400 of this embodiment includes sending an overlayed communication to a user device. In some embodiments, the user device may be actively receiving the overlayed communication from the alternative information format system.

FIG. 5 illustrates an additional non-limiting example process flow of the alternative information format system, in accordance with an embodiment of the disclosure. The method may be carried out by various components of the distributed computing environment 100 discussed herein (e.g., the system 130, one or more end-point device(s) 140, etc.). An example system may include at least one processing device and at least one non-transitory storage device with computer-readable program code stored thereon and accessible by the at least one processing device, wherein the computer-readable code when executed is configured to carry out the method discussed herein.

In some embodiments, an alternative information format system (e.g., similar to one or more of the systems described herein with respect to FIGS. 1A-1C) may perform one or more of the steps of process flow 500. For example, an alternative information format system (e.g., the system 130 described herein with respect to FIGS. 1A-1C) may perform the steps of process flow 500.

As shown in block 502, the process flow 500 of this embodiment includes an overlayed communication. In some embodiments, the overlayed communication may include a message (e.g., message 504), an alternative information format (e.g., alternative information format 506), and/or the like. In some embodiments, the overlayed communication may configure a graphical user interface of a user device (e.g., similar to end-point device(s) 140, or the like).

As shown in block 504, the process flow 500 of this embodiment includes a message. In some embodiments, the message 504 may include the message received by the alternative information format system.

As shown in block 506, the process flow 500 of this embodiment includes an alternative information format. In some embodiments, the alternative information format 506 may be positioned, adjusted, sized, placed, and/or the like over the message by the alternative information format system. In this way, the alternative information format 506 may be positioned in such a way as to allow for the message 504 to be viewed in the overlayed communication 502. Further, the positioning of the alternative information format 506 may include dynamic positioning, wherein the alternative information format 506 position may be adjusted in response to the content of the message 504.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for generating alternative information formats using advanced computational models for data analysis and automated processing, the system comprising:
   a processing device;
   a non-transitory storage device containing instructions when executed by the processing device, causes the processing device to perform the steps of:
   receive a message, wherein the message comprises one or more content components;
   transmit the message to an alternative information module, wherein the alternative information module comprises an alternative information database and an artificial intelligence module;
   determine, using the artificial intelligence module, an alternative information format, wherein the alternative information format is based on the message, and wherein the alternative information format comprises a natural language that uses the visual-manual modality to convey meaning;
   transmit the message to a sequencing module, wherein the sequencing module integrates the alternative information format into appropriate segments of the message;
   import the message into a message processing environment, wherein the message processing environment comprises the artificial intelligence module;
   determine, using the artificial intelligence module, the alternative information format that corresponds to the message;
   create an overlayed communication, wherein the overlayed communication comprises the message and the alternative information format;
   create overlayed communication elements, wherein the overlayed communication elements comprise the alternative information format that corresponds to the message;
   position the overlayed communication elements into the appropriate segments of the message; and
   export the overlayed communication, wherein exporting the overlayed communication comprises transferring the message to a user device.

2. The system of claim 1, wherein the message comprises:
   a video component;
   an audio component; and
   a textual component.

3. The system of claim 1, wherein the alternative information format comprises sign language.

4. The system of claim 1, wherein the alternative information database comprises a sign language database.

5. The system of claim 1, wherein executing the instructions further causes the processing device to:
   receive metadata, wherein the metadata comprises message characteristics associated with the message;
   determine, using the artificial intelligence module and in response to the metadata, the alternative information format; and
   create the overlayed communication, wherein the overlayed communication comprises the message and the alternative information format.

6. The system of claim 1, wherein executing the instructions further causes the processing device to:
   receive, from the user device, a user message, wherein the user message comprises an alternative information format;
   determine, using the artificial intelligence module and the alternative information database and in response to the user message, a standard information format;
   create a text overlay, wherein the text overlay comprises the user message and a text message that corresponds with the user message; and
   transmit the text overlay to a third party device.

7. A computer program product for generating alternative information formats using advanced computational models for data analysis and automated processing, the computer program product comprising a non-transitory computer-readable medium comprising code causing an apparatus to:
   receive a message, wherein the message comprises one or more content components;
   transmit the message to an alternative information module, wherein the alternative information module comprises an alternative information database and an artificial intelligence module;
   determine, using the artificial intelligence module, an alternative information format, wherein the alternative information format is based on the message, and wherein the alternative information format comprises a natural language that uses the visual-manual modality to convey meaning;
   transmit the message to a sequencing module, wherein the sequencing module integrates the alternative information format into appropriate segments of the message;
   import the message into a message processing environment, wherein the message processing environment comprises the artificial intelligence module;
   determine, using the artificial intelligence module, the alternative information format that corresponds to the message;
   create an overlayed communication, wherein the overlayed communication comprises the message and the alternative information format;
   create overlayed communication elements, wherein the overlayed communication elements comprise the alternative information format that corresponds to the message;
   position the overlayed communication elements into the appropriate segments of the message; and
   export the overlayed communication, wherein exporting the overlayed communication comprises transferring the message to a user device.

8. The computer program product of claim 7, wherein the message comprises:
   a video component;
   an audio component; and
   a textual component.

9. The computer program product of claim 7, wherein the alternative information format comprises sign language.

10. The computer program product of claim 7, wherein the alternative information database comprises a sign language database.

11. The computer program product of claim 7, wherein the code further causes the apparatus to:
- receive metadata, wherein the metadata comprises message characteristics associated with the message;
- determine, using the artificial intelligence module and in response to the metadata, the alternative information format; and
- create the overlayed communication, wherein the overlayed communication comprises the message and the alternative information format.

12. The computer program product of claim 7, wherein executing the instructions further causes the processing device to:
- receive, from the user device, a user message, wherein the user message comprises an alternative information format;
- determine, using the artificial intelligence module and the alternative information database and in response to the user message, a standard information format;
- create a text overlay, wherein the text overlay comprises the user message and a text message that corresponds with the user message; and
- transmit the text overlay to a third party device.

13. A method for generating alternative information formats using advanced computational models for data analysis and automated processing, the method comprising:
- receiving a message, wherein the message comprises one or more content components;
- transmitting the message to an alternative information module, wherein the alternative information module comprises an alternative information database and an artificial intelligence module;
- determining, using the artificial intelligence module, an alternative information format, wherein the alternative information format is based on the message, and wherein the alternative information format comprises a natural language that uses the visual-manual modality to convey meaning;
- transmitting the message to a sequencing module, wherein the sequencing module integrates the alternative information format into appropriate segments of the message;
- importing the message into a message processing environment, wherein the message processing environment comprises the artificial intelligence module;
- determining, using the artificial intelligence module, the alternative information format that corresponds to the message;
- creating an overlayed communication, wherein the overlayed communication comprises the message and the alternative information format;
- creating overlayed communication elements, wherein the overlayed communication elements comprise the alternative information format that corresponds to the message;
- positioning the overlayed communication elements into the appropriate segments of the message; and
- exporting the overlayed communication, wherein exporting the overlayed communication comprises transferring the message to a user device.

14. The method of claim 13, wherein the message comprises:
- a video component;
- an audio component; and
- a textual component.

15. The method of claim 13, wherein the alternative information format comprises sign language.

16. The method of claim 13, wherein the alternative information database comprises a sign language database.

17. The method of claim 13, wherein the method further comprises:
- receiving metadata, wherein the metadata comprises message characteristics associated with the message;
- determining, using the artificial intelligence module and in response to the metadata, the alternative information format; and
- creating the overlayed communication, wherein the overlayed communication comprises the message and the alternative information format.

* * * * *